United States Patent
Lee et al.

(10) Patent No.: US 12,543,787 B2
(45) Date of Patent: Feb. 10, 2026

(54) HEATER FOR CIGARETTE-LIKE ELECTRONIC CIGARETTE WITH EXCELLENT HEAT TRANSFER EFFICIENCY AND MANUFACTURING METHOD THEREOF

(71) Applicant: LATTRON CO. LTD., Daejeon (KE)

(72) Inventors: Jae-choon Lee, Daejeon (KR); Choung-Kook Lee, Daejeon (KR); Young-seong Wang, Daejeon (KR)

(73) Assignee: LATTRON CO. LTD., Daejeon (KR)

( * ) Notice: Subject to any disclaimer, the term of this patent is extended or adjusted under 35 U.S.C. 154(b) by 858 days.

(21) Appl. No.: 17/423,308

(22) PCT Filed: Nov. 14, 2019

(86) PCT No.: PCT/KR2019/015534
§ 371 (c)(1),
(2) Date: Jul. 15, 2021

(87) PCT Pub. No.: WO2020/149507
PCT Pub. Date: Jul. 23, 2020

(65) Prior Publication Data
US 2022/0079238 A1    Mar. 17, 2022

(30) Foreign Application Priority Data
Jan. 15, 2019   (KR) ........................ 10-2019-0004973

(51) Int. Cl.
*A24F 40/46*   (2020.01)
*A24F 40/20*   (2020.01)
(Continued)

(52) U.S. Cl.
CPC .............. *A24F 40/46* (2020.01); *A24F 40/20* (2020.01); *A24F 40/70* (2020.01); *B29C 65/48* (2013.01);
(Continued)

(58) Field of Classification Search
None
See application file for complete search history.

(56) References Cited

U.S. PATENT DOCUMENTS 7,265,324 B2   9/2007   Ozawa et al.
7,726,320 B2   6/2010   Robinson et al.
(Continued)

FOREIGN PATENT DOCUMENTS

CN   104223359 A   12/2014
CN   105124764 A   12/2015
(Continued)

OTHER PUBLICATIONS

English Translation of KR-102001441-B1 obtained from Espacenet (Year: 2024).*
(Continued)

*Primary Examiner* — Russell E Sparks
(74) *Attorney, Agent, or Firm* — Hauptman Ham, LLP (57) ABSTRACT

A heater for a cigarette-like electronic cigarette and a method of manufacturing the heater are provided. The heater is provided with a heat transfer efficiency improved by strengthening a bonding force between a cigarette support portion and a heater portion by thermally pressing and bonding the cigarette support portion and the heater portion together using a heat-dissipating adhesive layer with a heat-dissipating filler added to a high-heat-resistant thermoplastic polyimide resin.

12 Claims, 4 Drawing Sheets

(51) Int. Cl.
*A24F 40/70* (2020.01)
*B29C 65/48* (2006.01)
*C09J 179/08* (2006.01)
*F28F 13/00* (2006.01)
*H05B 3/06* (2006.01)
*H05B 3/46* (2006.01)
*B29L 31/00* (2006.01)
*C08K 3/04* (2006.01)

(52) U.S. Cl.
CPC ............. *C09J 179/08* (2013.01); *F28F 13/00* (2013.01); *H05B 3/06* (2013.01); *H05B 3/46* (2013.01); *B29L 2031/779* (2013.01); *C08K 3/041* (2017.05); *F28F 2013/001* (2013.01); *H05B 2203/017* (2013.01)

(56) References Cited

U.S. PATENT DOCUMENTS

| | | |
|---|---|---|
| 8,079,371 B2 | 12/2011 | Robinson et al. |
| 8,833,364 B2 | 9/2014 | Buchberger |
| 8,899,238 B2 | 12/2014 | Robinson et al. |
| 9,084,440 B2 | 7/2015 | Zuber et al. |
| 9,801,416 B2 | 10/2017 | Robinson et al. |
| 9,814,268 B2 | 11/2017 | Robinson et al. |
| 9,854,840 B2 | 1/2018 | Liu |
| 9,901,123 B2 | 2/2018 | Robinson et al. |
| 10,219,548 B2 | 3/2019 | Robinson et al. |
| 10,226,079 B2 | 3/2019 | Robinson et al. |
| 10,231,488 B2 | 3/2019 | Robinson et al. |
| 10,485,268 B2 | 11/2019 | Liu |
| 10,543,323 B2 | 1/2020 | Buchberger |
| 10,602,778 B2 | 3/2020 | Hu et al. |
| 10,694,783 B2 | 6/2020 | Jochnowitz |
| 11,641,871 B2 | 5/2023 | Robinson et al. |
| 11,647,781 B2 | 5/2023 | Robinson et al. |
| 11,758,936 B2 | 9/2023 | Robinson et al. |
| 11,785,978 B2 | 10/2023 | Robinson et al. |
| 11,805,806 B2 | 11/2023 | Robinson et al. |
| 2004/0238527 A1 | 12/2004 | Ozawa et al. |
| 2008/0092912 A1 | 4/2008 | Robinson et al. |
| 2010/0200006 A1 | 8/2010 | Robinson et al. |
| 2011/0126848 A1 | 6/2011 | Zuber et al. |
| 2011/0226236 A1 | 9/2011 | Buchberger |
| 2012/0060853 A1 | 3/2012 | Robinson et al. |
| 2014/0283825 A1 | 9/2014 | Buchberger |
| 2014/0299125 A1 | 10/2014 | Buchberger |
| 2015/0040930 A1 | 2/2015 | Robinson et al. |
| 2015/0047656 A1 | 2/2015 | Robinson et al. |
| 2015/0189915 A1 | 7/2015 | Liu |
| 2015/0272226 A1 | 10/2015 | Zuber et al. |
| 2016/0174613 A1 | 6/2016 | Zuber et al. |
| 2017/0020200 A1 | 1/2017 | Robinson et al. |
| 2017/0197043 A1 | 7/2017 | Buchberger |
| 2017/0197044 A1 | 7/2017 | Buchberger |
| 2017/0197046 A1 | 7/2017 | Buchberger |
| 2018/0000165 A1 | 1/2018 | Liu |
| 2018/0020733 A1 | 1/2018 | Jochnowitz |
| 2018/0140018 A1 | 5/2018 | Hu et al. |
| 2018/0146713 A1 | 5/2018 | Robinson et al. |
| 2018/0235285 A1 | 8/2018 | Robinson et al. |
| 2018/0235286 A1 | 8/2018 | Robinson et al. |
| 2019/0142070 A1 | 5/2019 | Robinson et al. |
| 2019/0166916 A1 | 6/2019 | Robinson et al. |
| 2019/0166917 A1 | 6/2019 | Robinson et al. |
| 2021/0077752 A1 | 3/2021 | Buchberger |
| 2021/0146067 A1 | 5/2021 | Buchberger |
| 2021/0352954 A1 | 11/2021 | Robinson et al. |
| 2022/0167656 A1 | 6/2022 | Robinson et al. |
| 2022/0256907 A1 | 8/2022 | Robinson et al. |
| 2023/0232886 A1 | 7/2023 | Robinson et al. |
| 2024/0000129 A1 | 1/2024 | Robinson et al. |

FOREIGN PATENT DOCUMENTS

| | | | | |
|---|---|---|---|---|
| CN | 204930384 U | | 1/2016 | |
| CN | 105544007 A | | 5/2016 | |
| CN | 208211472 U | | 12/2018 | |
| CN | 110495642 A | * | 11/2019 | |
| EP | 2131405 A2 | * | 12/2009 | ............ H01L 35/30 |
| JP | H08180962 A | * | 7/1996 | |
| JP | 2004355882 A | * | 12/2004 | ............... H05B 3/36 |
| KR | 10-0844445 B1 | | 7/2008 | |
| KR | 10-2012-0104533 A | | 9/2012 | |
| KR | 10-2015-0088628 A | | 8/2015 | |
| KR | 10-2016-0101867 A | | 8/2016 | |
| KR | 20160101867 A | * | 8/2016 | |
| KR | 10-1705070 B1 | | 2/2017 | |
| KR | 10-2018-0070512 A | | 6/2018 | |
| KR | 10-2018-0113841 A | | 10/2018 | |
| KR | 10-1927135 B1 | | 12/2018 | |
| KR | 10-2001441 B1 | | 7/2019 | |
| RU | 104 024 U1 | | 5/2011 | |
| WO | 2013/179341 A1 | | 12/2013 | |
| WO | 2014/047954 A1 | | 4/2014 | |
| WO | 2018/135888 A1 | | 7/2018 | |
| WO | 2018/190603 A1 | | 10/2018 | |
| WO | 2018/194291 A2 | | 10/2018 | |

OTHER PUBLICATIONS

English Translation of KR-101927135-B1 obtained from Espacenet (Year: 2024).*
English Translation of JP-2004355882-A obtained from Espacenet (Year: 2024).*
English Translation of KR-20160101867-A obtained from Espacenet (Year: 2024).*
English Translation of KR-20180113841-A obtained from Espacenet (Year: 2024).*
English Translation of JPH 08180962 A obtained from Espacenet (Year: 2024).*
Machine Translation of CN 110495642 (Year: 2025).*
Office Action issued on Oct. 31, 2023 for corresponding Chinese Patent Application No. 201980089264.X, along with partial English translation (19 pages).
International Search Report issued Feb. 26, 2020, corresponding to International Application No. PCT/KR2019/015534.
Office Action dated Jun. 25, 2024, in connection with Chinese Patent Application No. 201980089264.X, with English machine translation (14 pages).

* cited by examiner

HEATER FOR CIGARETTE-LIKE ELECTRONIC CIGARETTE WITH EXCELLENT HEAT TRANSFER EFFICIENCY AND MANUFACTURING METHOD THEREOF

CROSS-REFERENCE TO RELATED APPLICATION

The present application is a national stage filing under 35 U.S.C § 371 of PCT application number PCT/KR2019/015534 filed on Nov. 14, 2019 which is based upon and claims the benefit of priorities to Korean Patent Application No. 10-2019-0004973 filed on Jan. 15, 2019, in the Korean Intellectual Property Office.

TECHNICAL FIELD

The present disclosure relates to a heater for a cigarette-like electronic cigarette and a method of manufacturing the same and, more particularly, to a heater for a cigarette-like electronic cigarette with a heat transfer efficiency improved by strengthening a bonding force between a cigarette support portion and a heater portion by thermally pressing and bonding the cigarette support portion and the heater portion together using a heat-dissipating adhesive layer with a heat-dissipating filler added to a high-heat-resistant thermoplastic polyimide resin, and a method of manufacturing the same.

BACKGROUND ART

Generally, tobacco in the form of cigarettes has been almost the only means of inhaling preference substances, but recently, liquid-based electronic cigarettes have been established as one means.

In these liquid-based electronic cigarettes, heat or ultrasonic waves are applied to a cartridge containing an inhalable substance in the form of liquid to vaporize the inhalable substance into vapor to thereby generate fine particles. Thus, the liquid-based electronic cigarettes are completely different from conventional tobacco in the form of cigarettes generating smoke in terms of methods, and in particular, may prevent generation of various harmful substances that may be generated by combustion.

Meanwhile, recently, according to demands of consumers who prefer conventional tobacco in the form of cigarettes, a cigarette-like electronic cigarette having a regular cigarette shape has been proposed. The cigarette-like electronic cigarette has a configuration in which a user inhales through a cigarette filter having a configuration equivalent to that of general cigarettes while an inhalable substance contained in a cigarette is vaporized with a heater.

Unlike conventional tobacco in which dried tobacco leaves are filled, the cigarette-like electronic cigarette is filled with paper with an inhalable substance impregnated or applied onto the surface thereof. When a cigarette is inserted into a case of the cigarette-like electronic cigarette and a heater in the case is heated to vaporize the inhalable substance of the cigarette, a user may inhale the inhalable substance vaporized through a filter of the cigarette.

Thus, combustion does not occur in the cigarette-like electronic cigarette as with the liquid-based electronic cigarettes, and the inhalable substance vaporized by the same mechanism as when smoking conventional tobacco may be inhaled through the filter of the cigarette.

However, when adhesion between a heater portion and a cigarette support portion is not reliably accomplished in a heater for heating a cigarette, conventional cigarette-like electronic cigarettes have been likely to be exposed to the risk of fire due to overheating the heater portion.

As a related prior document, there is a Republic of Korea Patent Publication No. 10-0844445 (published on Jul. 8, 2008), which describes an electric heating cigarette.

DETAILED DESCRIPTION OF INVENTION

Technical Problem

The present disclosure provides a heater for a cigarette-like electronic cigarette with a heat transfer efficiency improved by strengthening a bonding force between a cigarette support portion and a heater portion by thermally pressing and bonding the cigarette support portion and the heater portion together using a heat-dissipating adhesive layer with a heat-dissipating filler added to a high-heat-resistant thermoplastic polyimide resin, and a method of manufacturing the same.

Solution to Problem

According to an aspect of the present disclosure, a heater for a cigarette-like electronic cigarette with excellent heat transfer efficiency includes: a cigarette support portion to support a cigarette; a heater portion located on outside of the cigarette support portion to heat the cigarette bound to the cigarette support portion; and a heat-dissipating adhesive layer coated on the surface of the cigarette support portion to bond the cigarette support portion and the heater portion together.

According to an aspect of the present disclosure, a method of manufacturing a heater for a cigarette-like electronic cigarette with excellent heat transfer efficiency includes: forming a heat-dissipating adhesive layer on outer surface of a cigarette support portion; arranging a heater portion to surround outside of the cigarette support portion on which the heat-dissipating adhesive layer is formed; and bonding the cigarette support portion and the heater portion together with the heat-dissipating adhesive layer by thermally pressing the cigarette support portion and the heater portion.

Advantageous Effects of Invention

In a heater for a cigarette-like electronic cigarette with excellent heat transfer efficiency and a method of manufacturing the same according to the present disclosure, a bonding force between a cigarette support portion and a heater portion can be strengthened by thermally pressing and bonding the cigarette support portion and the heater portion together using a heat-dissipating adhesive layer with a heat-dissipating filler added to a high-heat-resistant thermoplastic polyimide resin, and a heat transfer efficiency can be improved by the addition of the heat-dissipating filler having thermal conductivity.

As a result, in the heater for a cigarette-like electronic cigarette with excellent heat transfer efficiency and the method of manufacturing the same according to the present disclosure, the heat-dissipating adhesive layer located between the cigarette support portion and the heater portion strengthens an adhesive force between the cigarette support portion and the heater portion so that a reliable adhesive force is accomplished, and due to improvement of heat dissipation characteristics through the heat-dissipating filler, overheating in the heater portion can be prevented in advance during operation of the cigarette-type electronic cigarette.

EMBODIMENTS OF INVENTION

Advantages and features of the present disclosure and methods of achieving them will become apparent with reference to the embodiments described below in detail in conjunction with the accompanying drawings. However, the present disclosure is not limited to the embodiments disclosed below, but will be embodied in various different forms, the embodiments merely allow the present disclosure to be complete and are provided to fully inform those of ordinary skill in the art to which the present disclosure belongs of the scope of the present disclosure, and the present invention is only defined by the scope of the claims. Throughout the specification, like reference numerals refer to like elements.

Hereinafter, with reference to the accompanying drawings, a heater for a cigarette-like electronic cigarette with excellent heat transfer efficiency and a method of manufacturing the same according to an exemplary embodiment of the present disclosure will be described in detail as follows.

Figure 1:
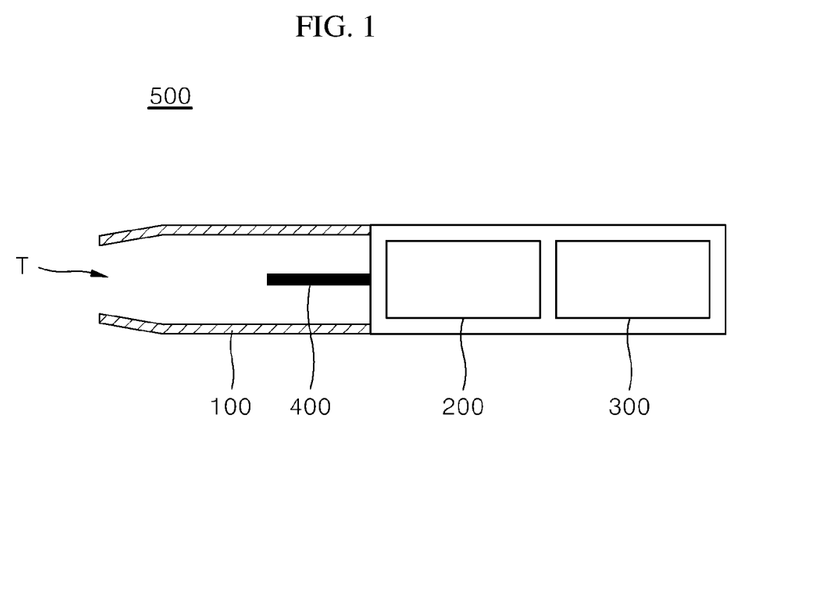
FIG. 1 is a cross-sectional view of a cigarette-like electronic cigarette with excellent heat transfer efficiency, according to an embodiment of the present disclosure.
Figure 2:
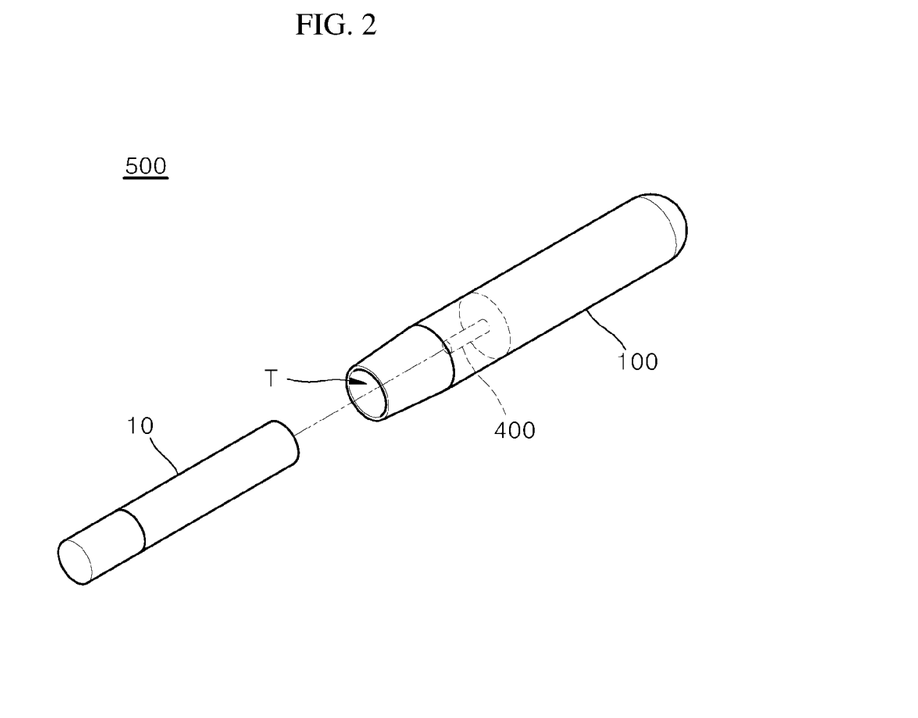
FIG. 2 is a perspective view of a cigarette-like electronic cigarette with excellent heat transfer efficiency, according to an embodiment of the present disclosure.

FIG. 1 is a cross-sectional view of a cigarette-like electronic cigarette with excellent heat transfer efficiency, according to an embodiment of the present disclosure, and FIG. 2 is a perspective view of the cigarette-like electronic cigarette with excellent heat transfer efficiency, according to an embodiment of the present disclosure.

Referring to FIGS. 1 and 2, a cigarette-like electronic cigarette 500 with excellent heat transfer efficiency according to an embodiment of the present disclosure includes a case 100, a battery 200, a controller 300, and a heater 400.

The case 100 includes a cigarette insertion hole T for inserting a cigarette 10 at one end portion thereof. The case 100 includes an internal space for mounting the battery 200 and the controller 300. The case 100 may be designed as a separation type. For example, when a user turns the case 100 clockwise or counterclockwise, upper and lower ends of the case 100 may be separated from each other.

In this case, only elements related to embodiments of the present disclosure are shown in FIGS. 1 and 2. Thus, those of ordinary skill in the art related to embodiments of the present disclosure may understand that the cigarette-like electronic cigarette 500 with excellent heat transfer efficiency according to an embodiment of the present disclosure may further include other general-purpose elements in addition to the elements shown in FIGS. 1 and 2.

When the cigarette 10 is inserted into the cigarette insertion hole T of the case 100, the cigarette-like electronic cigarette 500 heats the heater 400. In this case, an aerosol generating material in the cigarette 10 is heated by the heated heater 400, and thus an aerosol is generated. The generated aerosol is transmitted to a user through a filter of the cigarette 10.

The battery 200 supplies power used to operate the cigarette-like electronic cigarette 500. For example, the battery 200 may supply power so that the heater 400 is heated. Also, the battery 200 may supply power required to operate the controller 300. Furthermore, the battery 200 may supply power required to operate a display, a sensor, a motor, and the like installed in the cigarette-like electronic cigarette 500.

The battery 200 may include, but is not limited to, a lithium iron phosphate (LiFePO$_4$) battery.

The controller 300 takes overall control of operations of the cigarette-like electronic cigarette 500. In detail, the controller 300 controls operations of other elements included in the cigarette-like electronic cigarette 500 along with the battery 200 and the heater 400. Also, the controller 300 may identify a state of each element of the cigarette-type electronic cigarette 500 and determine whether the cigarette-like electronic cigarette 500 is in an operable state.

To this end, the controller 300 includes at least one processor. A processor may be implemented by an array of a plurality of logic gates, or by a combination of a general-purpose microprocessor and a memory in which a program executable in the microprocessor is stored.

The heater 400 is heated by power supplied from the battery 200. When the cigarette 10 is inserted into the cigarette insertion hole T of the case 100, the heater 400 surrounds the outside of the cigarette 10. To this end, the heater 400 may have a cylindrical structure including a cigarette holder. Thus, the heated heater 400 may heat the aerosol generating material in the cigarette 10.

To this end, the heater 400 of the present disclosure includes a cigarette support portion, a heater portion, and a heat-dissipating adhesive layer for bonding the cigarette support portion and the heater portion together.

Thus, the heater 400 according to an embodiment of the disclosure may have an improved heat transfer efficiency by strengthening a bonding force between the cigarette support portion and the heater portion by thermally pressing and bonding the cigarette support portion and the heater portion together using the heat-dissipating adhesive layer with a heat-dissipating filler added to a high-heat-resistant thermoplastic polyimide resin. This will be described in more detail with reference to the accompanying drawings below.

Figure 3:
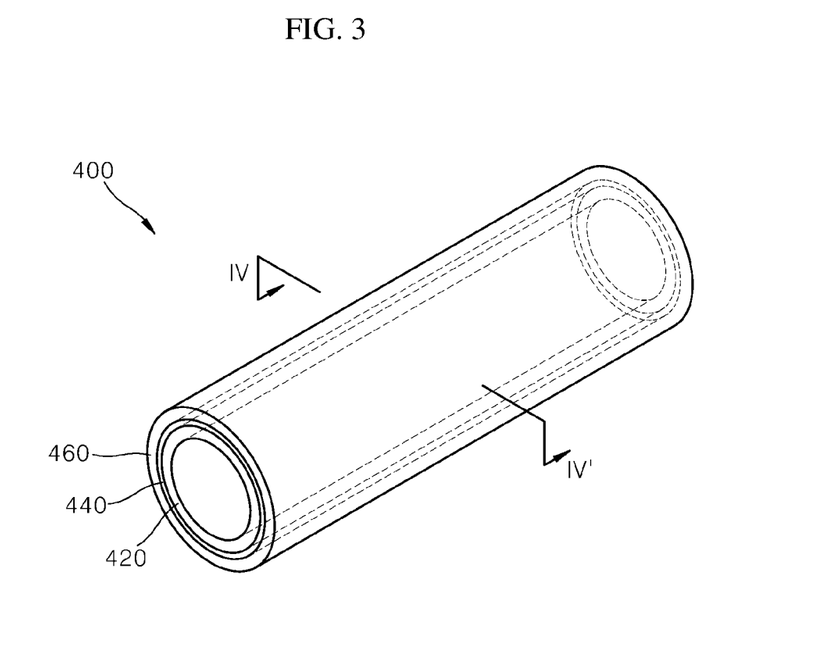
FIG. 3 is a perspective view of a heater for a cigarette-like electronic cigarette with excellent heat transfer efficiency, according to an embodiment of the present disclosure.
Figure 4:
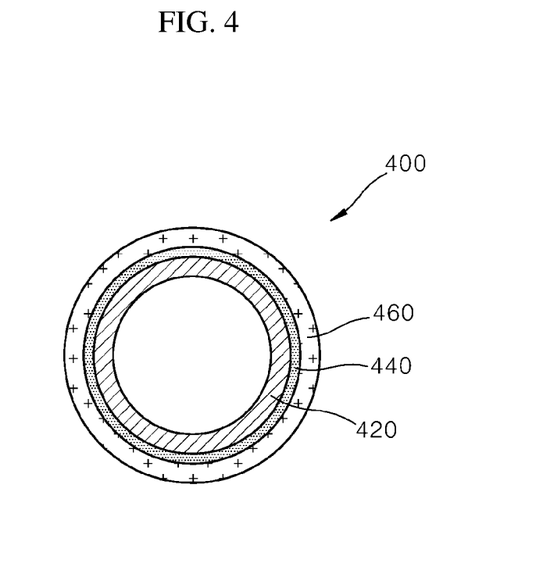
FIG. 4 is a cross-sectional view taken along line IV-IV' of FIG. 3.

FIG. 3 is a perspective view of a cigarette-like electronic cigarette with excellent heat transfer efficiency, according to an embodiment of the disclosure, and FIG. 4 is a cross-sectional view taken along line IV-IV' of FIG. 3.

Referring to FIGS. 3 and 4, the heater 400 according to an embodiment of the present disclosure includes a cigarette support portion 420, a heater portion 460, and a heat-dissipating adhesive layer 440.

The cigarette support portion 420 serves to support a cigarette. The cigarette support portion 420 may be located at the center of the heater 400. In this case, the cigarette support portion 420 may have a cylindrical shape having a hollow therein. Considering that a temperature of the heater 400 reaches about 350° C. during operation of a cigarette-type electronic cigarette, the cigarette support portion 420 may include a polymer or ceramic material having a heat resistance of 350° C. or more.

For example, a non-thermoplastic polyimide resin may be used as a material of the cigarette support portion 420. The non-thermoplastic polyimide resin may have a coefficient of thermal expansion (CTE) of 15-20 ppm/K, a glass transition temperature (Tg) of 380-450° C., and a thermal decomposition temperature (Td) of 550-600° C.

The thermoplastic polyimide resin may include diamine and dianhydride. The diamine may include at least one of 4,4-oxydianiline (ODA) and para-phenylenediamine (PPDA). The dianhydride may include at least one of pyromellitic dianhydride (PMDA) and diphenyl tetra carboxylic acid dianhydride (BPDA).

The heater portion 460 is located on the outside of the cigarette support portion 420, and is mounted in order to heat the cigarette 10 (see FIG. 2) bound to the cigarette support portion 420. As with the cigarette support portion 420, the heater portion 460 may include a polymer or ceramic material having a heat resistance of 350° C. or more.

For example, a non-thermoplastic polyimide resin may be used as a material of the heater portion 460. The non-thermoplastic polyimide resin may have a coefficient of thermal expansion (CTE) of 15-20 ppm/K, a glass transition temperature (Tg) of 380-450° C., and a thermal decomposition temperature (Td) of 550-600° C.

The thermoplastic polyimide resin may include diamine and dianhydride. The diamine may include at least one of 4,4-oxydianiline (ODA) and para-phenylenediamine (PPDA). The dianhydride may include at least one of pyromellitic dianhydride (PMDA) and diphenyl tetra carboxylic acid dianhydride (BPDA).

The heater portion 460 may include a heat generating pattern (not shown) to heat a cigarette bound to the cigarette support portion 420. The heat generating pattern may be located on the surface or inside of the heater portion 460. The heat generating pattern may include a metal material with excellent conductivity. In detail, the heat generating pattern may include at least one of gold (Au), silver (Ag), copper (Cu), nickel (Ni), titanium (Ti), aluminum (Al), chromium (Cr), and the like, and may preferably include copper. The heat generating pattern may have a thickness of 1-30 μm, but the present disclosure is not limited thereto.

The heat-dissipating adhesive layer 440 is coated on the cigarette support portion 420, and bonds the cigarette support portion 420 and the heater portion 460 together. That is, the heat-dissipating adhesive layer 440 is located between the cigarette support portion 420 and the heater portion 460 to stably adhere the heater portion 460 to the cigarette support portion 420, and serves to prevent overheating in the heater portion 460 during operation of a cigarette-type electronic cigarette.

The heat-dissipating adhesive layer 440 may have a thickness of 0.5-10 μm. When a thickness of the heat-dissipating adhesive layer 440 is less than 0.5 μm, the thickness is too small, and thus the adhesion may not be reliably accomplished. In contrast, when the thickness of the heat-dissipating adhesive layer 440 is greater than 10 μm, a heat transfer efficiency may be reduced due to excessive thickness in the design.

Likewise, the heat-dissipating adhesive layer 440 is coated on the surface of the cigarette support portion 420 so that heat transfer is facilitated to prevent overheating of the heater portion 460, and may include a thermoplastic polyimide resin and a heat-dissipating filler added into the thermoplastic polyimide resin.

In this case, the thermoplastic polyimide resin may have a glass transition temperature (Tg) of 240-300° C. and a thermal decomposition temperature (Td) of 500-550° C. Likewise, because the cigarette support portion 420 and the heater portion 460 are thermally pressed and bonded together using a high-heat-resistant thermoplastic polyimide resin having a glass transition temperature (Tg) of 240-300° C. and a thermal decomposition temperature (Td) of 500-550° C., an adhesive force between the cigarette support portion 420 and the heater portion 460 is improved, and thus overheating in the heater portion 460 may be prevented in advance.

The thermoplastic polyimide resin may include diamine and dianhydride. In this case, the diamine may include at least one selected from 4,4-oxydianiline (ODA), para-phenylenediamine (PPDA), 2,2-bis(4-(4-amino phenoxy)phenyl) propane (BAPP), bis(4-(3-aminophenoxy)phenyl) sulfone (m-BAPS), and 1,3-bis(4-aminophenoxy)benzene (TPE-R). Also, the dianhydride may include at least one of pyromellitic dianhydride (PMDA), diphenyl tetra carboxylic acid dianhydride (BPDA), 4,4'-bispheno A dianhydrie (BPADA), and benzophenone tetracarboxylic acid dianhydride (BTDA).

The heat-dissipating filler is dispersed and arranged in the thermoplastic polyimide resin. Likewise, a heat transfer efficiency is maximized through complexation by dispersing and arranging the heat-dissipating filler having thermal conductivity in the thermoplastic polyimide resin, thereby improving heat-dissipation characteristics.

Thus, the heater 400 according to an embodiment of the disclosure includes the heat-dissipating adhesive layer 440 compounded by adding the heat-dissipating filler into the thermoplastic polyimide resin, and thus has a thermal conductivity of 0.5-1.2 W/m·k.

The heat-dissipating filler may be added in an amount of 20-50 parts by weight based on 100 parts by weight of the thermoplastic polyimide resin. When an amount of the heat-dissipating filler added is less than 20 parts by weight based on 100 parts by weight of the thermoplastic polyimide resin, it is difficult to improve the heat transfer efficiency. In contrast, when an amount of the heat-dissipating filler added is greater than 50 parts by weight based on 100 parts by weight of the thermoplastic polyimide resin, an amount of the thermoplastic polyimide resin is relatively reduced, and thus it is difficult to ensure heat resistance and adhesive force.

In this case, the heat-dissipating filler may include at least one of carbon-based fillers including carbon black, carbon nanotube, and graphene.

Also, the heat-dissipating filler may include at least one of oxide-based fillers including boron nitride, silicon oxide, zinc oxide, and aluminium oxide.

The heat-dissipating filler may have an average diameter and length of 50-1,000 nm. When an average diameter and length of the heat-dissipating filler is less than 50 nm, an adhesive force and a heat resistance may be reduced due to a problem of dispersibility according to miniaturization of the size thereof. In contrast, when an average diameter and length of the heat-dissipating filler is greater than 1,000 nm, a thickness of the thermoplastic polyimide resin increases, resulting in an increase in heat resistance.

Figure 5:
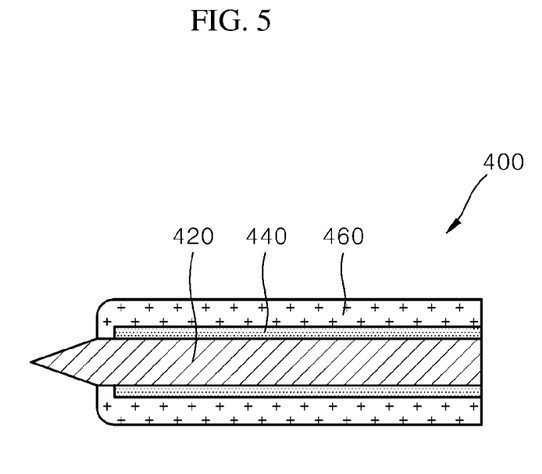
FIG. 5 is a cross-sectional view of a heater for a cigarette-like electronic cigarette with excellent heat transfer efficiency, according to a modified embodiment of the present disclosure.

Meanwhile, FIG. 5 is a cross-sectional view of a heater for a cigarette-like electronic cigarette with excellent heat transfer efficiency, according to a modified embodiment of the present disclosure.

As shown in FIG. 5, the heater 400 according to a modified embodiment of the present disclosure includes the cigarette support portion 420, the heater portion 460, and the heat-dissipating adhesive layer 440.

In this case, the cigarette support portion 420 may have a cylindrical structure with pointed one end portion and no hollow.

The heater portion 460 is arranged on the outside of the cigarette support portion 420, and servers to heat a cigarette bound to the cigarette support portion 420.

The heat-dissipating adhesive layer 440 is coated on the cigarette support portion 420, and serves to bond the cigarette support portion 420 and the heater portion 460 together. Here, the heat-dissipating adhesive layer 440 may be coated to cover the entire surface of the cigarette support portion 420 except for the pointed one end portion. Alternatively, the heat-dissipating adhesive layer 440 may be coated on the entire outer surface of the cigarette support portion 420.

Thus, the heater 400 according to a modified embodiment of the present disclosure has substantially the same as the heater for a cigarette-like electronic cigarette according to an embodiment described with reference to FIGS. 3 and 4, except that there is a difference in the shape of some configurations, and thus redundant description thereof will be omitted.

In the heater for a cigarette-like electronic cigarette with excellent heat transfer efficiency according to the present disclosure, a bonding force between a cigarette support portion and a heater portion may be strengthened by thermally pressing and bonding the cigarette support portion and the heater portion together using a heat-dissipating adhesive layer with a heat-dissipating filler added into a high-heat-resistant thermoplastic polyimide resin, and a heat transfer efficiency may be improved by the addition of the heat-dissipating filler having thermal conductivity.

As a result, in the heater for a cigarette-like electronic cigarette with excellent heat transfer efficiency according to the present disclosure, the heat-dissipating adhesive layer arranged between the cigarette support portion and the heater portion strengthens an adhesive force between the cigarette support portion and the heater portion so that a reliable adhesive force is accomplished, and due to improvement of heat dissipation characteristics through the heat-dissipating filler, overheating in the heater portion may be prevented in advance during operation of the cigarette-like electronic cigarette.

Hereinafter, a method of manufacturing a heater for a cigarette-like electronic cigarette with excellent heat transfer efficiency according to an embodiment of the present disclosure will be described with reference to the accompanying drawings.

Figure 6:
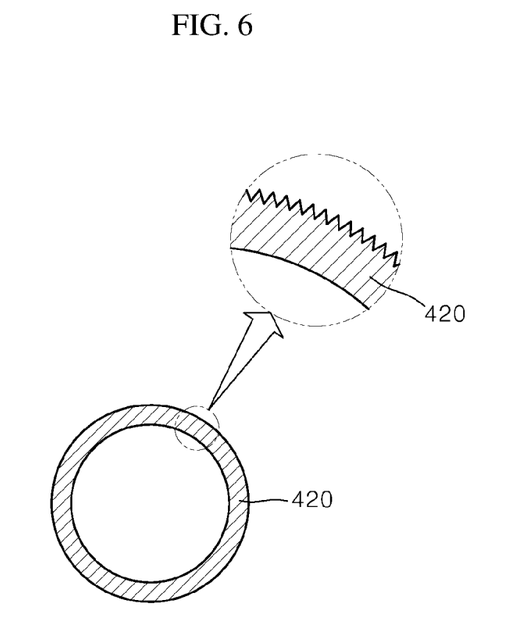
FIGS. 6 to 8 are process cross-sectional views of a method of manufacturing a heater for a cigarette-like electronic cigarette with excellent heat transfer efficiency, according to an embodiment of the present disclosure.
Figure 7:
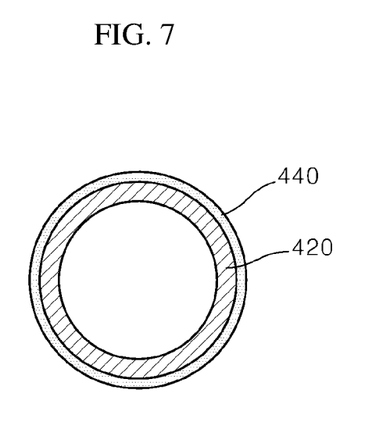
Figure 8:
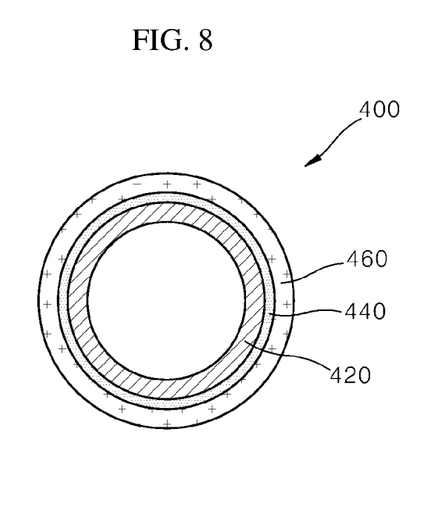

FIGS. 6 to 8 are process ross-sectional views of a method of manufacturing a heater for a cigarette-like electronic cigarette with excellent heat transfer efficiency, according to an embodiment of the present disclosure.

As shown in FIG. 6, a surface modification is performed to modify the outer surface of the cigarette support portion 420.

In this case, the cigarette support portion 420 may have a cylindrical shape having a hollow in the center thereof. Considering that a temperature of the heater 400 reaches about 350° C. during operation of a cigarette-type electronic cigarette, the cigarette support portion 420 may include a polymer or ceramic material having a heat resistance of 350° C. or more.

For example, a non-thermoplastic polyimide resin may be used as a material of the cigarette support portion 420. The non-thermoplastic polyimide resin may have a coefficient of thermal expansion (CTE) of 15-20 ppm/K, a glass transition temperature (Tg) of 380-450° C., and a thermal decomposition temperature (Td) of 550-600° C.

In this operation, the surface modification is performed in order to improve the surface roughness of the outer surface of the cigarette support portion 420. The surface modification may include a chemical wet polishing method using an etchant. Also, the surface modification may include a physical dry polishing method using a polishing roll.

Likewise, due to the improvement in the surface roughness through the surface modification, a bonding area to which the heat-dissipating adhesive layer 440 (see FIG. 7) is attached to the outer surface of the cigarette support portion 420 may be increased. As a result, an adhesive force between the cigarette support portion 420 and the heat-dissipating adhesive layer may be further improved.

Next, as shown in FIG. 7, the heat-dissipating adhesive layer 440 is formed on the outer surface of the cigarette support portion 420 that has been subjected to the surface modification.

In this operation, the heat-dissipating adhesive layer 440 may be formed by coating a thermoplastic polyimide resin composition on the outer surface of the cigarette support portion 420 by any one method of spin coating, nozzle coating, spray coating, and dip coating, and bar coating, and then drying. In this case, the drying may be performed at a temperature of 60° C. for 10 minutes and at a temperature of 150° C. for 10 minutes to volatilize and remove a solvent in the thermoplastic polyimide resin composition, and the drying may be performed at a temperature of 200° C. for 10 minutes and at a temperature of 350° C. for 10 minutes, but the present disclosure is not limited thereto.

The heat-dissipating adhesive layer 440 may have a thickness of 0.5-10 μm. When a thickness of the heat-dissipating adhesive layer 440 is less than 0.5 μm, the thickness is too small, and thus the adhesion may not be reliably accomplished. In contrast, when the thickness of the heat-dissipating adhesive layer 440 is greater than 10 μm, a heat transfer efficiency may be reduced due to excessive thickness in the design.

Likewise, the heat-dissipating adhesive layer 440 is coated on the surface of the cigarette support portion 420 so that heat transfer is facilitated to prevent overheating of the heater portion 460 (see FIG. 8), and may include a thermoplastic polyimide resin and a heat-dissipating filler added into the thermoplastic polyimide resin.

In this case, the thermoplastic polyimide resin may have a glass transition temperature (Tg) of 240-300° C. and a thermal decomposition temperature (Td) of 500-550° C.

The thermoplastic polyimide resin may include diamine and dianhydride. In this case, the diamine may include at least one selected from 4,4-oxydianiline (ODA), para-phenylenediamine (PPDA), 2,2-bis(4-(4-amino phenoxy)phenyl) propane (BAPP), and 1,3-bis(4-aminophenoxy)benzene (TPE-R). Also, the dianhydride may include at least one of pyromellitic dianhydride (PMDA), diphenyl tetra carboxylic acid dianhydride (BPDA), 4,4'-bispheno A dianhydrie (BPADA), bis(4-(3-aminophenoxy)phenyl) sulfone (m-BAPS), and benzophenone tetracarboxylic acid dianhydride (BTDA).

The heat-dissipating filler is dispersed and arranged in the thermoplastic polyimide resin. Likewise, a heat transfer efficiency is maximized through complexation by dispersing and arranging the heat-dissipating filler having thermal conductivity in the thermoplastic polyimide resin, thereby improving heat-dissipation characteristics.

The heat-dissipating filler may be added in an amount of 20-50 parts by weight based on 100 parts by weight of the thermoplastic polyimide resin. When an amount of the heat-dissipating filler added is less than 20 parts by weight based on 100 parts by weight of the thermoplastic polyimide resin, it is difficult to well exhibit the effect of improving heat-dissipation characteristics. In contrast, when an amount of the heat-dissipating filler added is greater than 50 parts by weight based on 100 parts by weight of the thermoplastic polyimide resin, an amount of the thermoplastic polyimide resin is relatively reduced, and thus it is difficult to ensure heat resistance and adhesive force.

In this case, the heat-dissipating filler may include at least one of carbon-based fillers including carbon black, carbon nanotube, and graphene.

Also, the heat-dissipating filler may include at least one of oxide-based fillers including boron nitride, silicon oxide, zinc oxide, and aluminum oxide.

The heat-dissipating filler may have an average diameter and length of 50-1,000 nm. When an average diameter and length of the heat-dissipating filler is less than 50 nm, an adhesive force and a heat resistance may be reduced due to a problem of dispersibility according to miniaturization of the size thereof. In contrast, when an average diameter and length of the heat-dissipating filler is greater than 1,000 nm, a thickness of the thermoplastic polyimide resin increases, resulting in an increase in heat resistance.

As shown in FIG. 8, the heater portion 460 is arranged to surround the outer side of the cigarette support portion 420 on which the heat-dissipating adhesive layer 440 is formed.

As with the cigarette support portion 420, the heater portion 460 may include a polymer or ceramic material having a heat resistance of 350° C. or more.

For example, a non-thermoplastic polyimide resin may be used as a material of the heater portion 460. The non-thermoplastic polyimide resin may have a coefficient of thermal expansion (CTE) of 15-20 ppm/K, a glass transition temperature (Tg) of 380-450° C., and a thermal decomposition temperature (Td) of 550-600° C.

The heater portion 460 may include a heat generating pattern to heat a cigarette bound to the cigarette support portion 420. The heat generating pattern may be arranged on the surface or inside of the heater portion 460.

Next, the cigarette support portion 420 and the heater portion 460 are thermally pressed, and the cigarette support portion 420 and the heater portion 460 are bonded together through the heat-dissipating adhesive layer 440.

In this operation, the thermally pressing may be carried out under a condition of 260-350° C. When a temperature of the thermal pressure is less than 260° C., an interfacial adhesive force is not sufficient, and thus the cigarette support portion 420 and the heater portion 460 may not be well bonded. In contrast, when a temperature of the thermal pressure is greater than 350° C., there is no more increase in effect and only the manufacturing cost is increased, which is not economical.

As described above, the heater 400 according to an embodiment of the present disclosure may be manufactured.

EXAMPLES

Hereinafter, exemplary embodiments will be described to help the understanding of the present disclosure. However, it is obvious to those skilled in the art that the following examples are merely illustrative of the present invention and various changes and modifications are possible within the scope and spirit of the present disclosure, and it goes without saying that such changes and modifications fall within the scope of the appended claims.

1. Manufacturing of Heater for Cigarette-Like Electronic Cigarette

Example 1

An outer surface of a cigarette support portion having a thickness of 80 μm was subjected to surface modification by a physical dry polishing method using a polishing roll.

Next, the outer surface of the surface-modified cigarette support portion was coated with a carbon nanotube having an average diameter of 500 nm, a thermoplastic polyimide resin, and a heat-dissipating adhesive composition formed as a solvent to a thickness of 5 μm by a nozzle coating method, followed by drying at 60° C. for 10 minutes and 150° C. for 10 minutes and then curing at 200° C. for 10 minutes and 350° C. for 10 minutes, thereby forming a heat-dissipating adhesive layer.

Next, a heater portion having a thickness of 120 μm was arranged to surround the outside of the cigarette support portion on which the heat-dissipating adhesive layer was formed, followed by thermal pressing at 300° C., thereby manufacturing a heater for a cigarette-like electronic cigarette.

Here, a thermoplastic polyimide resin was obtained by dissolving 0.139 mol of 2,2-Bis (4-(4-amino phenoxy)phenyl) propane (BAPP) in 410 g of dimethylacetamide (DMAc) and then dissolving 0.111 mol of pyromellitic dianhydride (PMDA) and 0.028 mol of benzophenone tetracarboxylic acid dianhydride (BTDA) therein, and then reacting and synthesizing them. In this case, a glass transition temperature (Tg) of the synthesized thermoplastic polyimide resin was 280° C.

Also, the carbon nanotube of the heat-dissipating adhesive layer was added in an amount of 20 parts by weight based on 100 parts by weight of the thermoplastic polyimide resin.

Example 2

A heater for a cigarette-like electronic cigarette was manufactured in the same manner as in Example 1, except that the carbon nanotube of the heat-dissipating adhesive layer was added in an amount of 30 parts by weight based on 100 parts by weight of the thermoplastic polyimide resin.

Example 3

A heater for a cigarette-like electronic cigarette was manufactured in the same manner as in Example 1, except that, instead of the carbon nanotube, carbon black having an average diameter of 300 nm was added in an amount of 40 parts by weight based on 100 parts by weight of the thermoplastic polyimide resin.

Example 4

A heater for a cigarette-like electronic cigarette was manufactured in the same manner as in Example 1, except that the heat-dissipating adhesive layer was formed to have a thickness of 2 μm.

Example 5

A heater for a cigarette-like electronic cigarette was manufactured in the same manner as in Example 1, except that the heat-dissipating adhesive layer was formed to have a thickness of 8 μm.

Comparative Example 1

A heater for a cigarette-like electronic cigarette was manufactured in the same manner as in Example 1, except that, without carrying out the surface modification, the outer surface of the cigarette support portion was coated with the thermoplastic polyimide resin and the adhesive composition formed as a solvent to a thickness of 5 μm by the nozzle coating method, followed by drying at 60° C. for 10 minutes and 150° C. for 10 minutes and then curing at 200° C. for 10 minutes and 350° C. for 10 minutes, thereby forming an adhesive layer.

Comparative Example 2

A heater for a cigarette-like electronic cigarette was manufactured in the same manner as in Example 1, except that the carbon nanotube of the heat-dissipating adhesive layer was added in an amount of 5 parts by weight based on 100 parts by weight of the thermoplastic polyimide resin.

2. Physical Property Evaluation

Table 1 shows results of evaluation on physical properties of heaters for a cigarette-like electronic cigarette manufactured according to Examples 1 to 5 and Comparative Examples 1 and 2.
1) Thermal Conductivity After the heaters for a cigarette-like electronic cigarette were each cut to a size of 10 mm*10 mm (length*width), the thermal conductivity was measured using a thermal conductivity meter and is shown in Table 1.
2) Adhesive Force After the heaters for a cigarette-like electronic cigarette were each cut to a size of 10 mm*10 mm (length*width), peeling strength between the heat-dissipating adhesive layer and the cigarette support portion was measured by an IPC-TM-650 2.4.9 method of carrying out peeling at an angle of 90° and is shown in Table 1.

TABLE 1

| Category | Thermal conductivity (W/m · k) | Adhesive force (kgf/cm) |
| --- | --- | --- |
| Example 1 | 0.65 | 1.54 |
| Example 2 | 0.77 | 1.37 |
| Example 3 | 1.04 | 1.29 |
| Example 4 | 0.61 | 1.34 |
| Example 5 | 0.72 | 1.61 |
| Comparative Example 1 | 0.11 | 0.87 |
| Comparative Example 2 | 0.32 | 1.51 |

Referring to Table 1, it was confirmed that the heaters for a cigarette-like electronic cigarette manufactured according to Examples 1 to 5 satisfied both the thermal conductivity of 0.5-1.1 W/m·k and the adhesive force of 1.0 kgf/cm or more, each corresponding to a target value.

In contrast, the heater for a cigarette-like electronic cigarette manufactured according to Comparative Example 1 did not satisfy both the thermal conductivity and the adhesive force.

Also, although the adhesive force of the heater for a cigarette-like electronic cigarette manufactured according to Comparative Example 2 satisfied the target value, the thermal conductivity thereof was only 0.11 W/m·k and did not reach the target value.

Hereinbefore, although embodiments of the present disclosure have been mainly described, various changes or modifications may be made at the level of those skilled in the art to which the present disclosure pertains. Such changes and modifications can be said to belong to the present disclosure without departing from the scope of the technical spirit provided by the present disclosure. Thus, the scope of the present disclosure should be judged by the claims described below.

EXPLANATION OF REFERENCE NUMERALS

400: Heater for a cigarette-like electronic cigarette
420: Cigarette support portion
440: Heat-dissipating adhesive layer
460: Heater portion

The invention claimed is:

1. A heater for an electronic cigarette, the heater comprising:
a cigarette support portion configured to support a cigarette;
a heater portion located on an outer side of the cigarette support portion to heat the cigarette bound to the cigarette support portion; and
a heat-dissipating adhesive layer coated on a surface of the cigarette support portion to bond the cigarette support portion and the heater portion together,
wherein
the heater portion is located on an outer side of the heat-dissipating adhesive layer in a radial direction of the cigarette support portion,
the cigarette support portion includes a polymer or ceramic material having a heat resistance of 350° C. or more,
the heat-dissipating adhesive layer is comprised of:
a thermoplastic polyimide resin; and
a heat-dissipating filler dispersed and arranged in the thermoplastic polyimide resin,
the heat-dissipating filler is added in an amount of 20-50 by weight based on 100 by weight of the thermoplastic polyimide resin,
an adhesive force between the heat-dissipating adhesive layer and the cigarette support portion is 1.0 kgf/cm to 1.61 kgf/cm, and
the heater has a thermal conductivity of 0.5-1.2 W/m·k.

2. The heater of claim 1, wherein the thermoplastic polyimide resin has glass transition temperature (Tg) of 240-300° C. and thermal decomposition temperature (Td) of 500-550° C.

3. The heater of claim 1, wherein the heat-dissipating filler is comprised of at least one of carbon-based fillers including carbon black, carbon nanotube, and/or graphene.

4. The heater of claim 1, wherein the heat-dissipating filler is comprised of at least one of oxide-based fillers including boron nitride, silicon oxide, zinc oxide, and/or aluminum oxide.

5. The heater of claim 1, wherein the heat-dissipating adhesive layer has a thickness of 0.5-10 μm.

6. A method of manufacturing a heater for an electronic cigarette, the method comprising:
forming a heat-dissipating adhesive layer on an outer surface of a cigarette support portion, wherein the cigarette support portion includes a polymer or ceramic material having a heat resistance of 350° C. or more;
arranging a heater portion to surround outside of the cigarette support portion on which the heat-dissipating adhesive layer is formed, wherein the heater portion is arranged on an outer side of the heat-dissipating adhesive layer in a radial direction of the cigarette support portion; and
bonding the cigarette support portion and the heater portion together with the heat-dissipating adhesive layer by thermally pressing the cigarette support portion and the heater portion to obtain the heater,
wherein
the heat-dissipating adhesive layer is comprised of:
a thermoplastic polyimide resin; and
a heat-dissipating filler dispersed and arranged in the thermoplastic polyimide resin,
the heat-dissipating filler is added in an amount of 20-50 by weight based on 100 by weight of the thermoplastic polyimide resin, and
an adhesive force between the heat-dissipating adhesive layer and the cigarette support portion is 1.0 kgf/cm to 1.61 kgf/cm, and
the heater has a thermal conductivity of 0.5-1.2 W/m·k.

7. The method of claim 6, further comprising: prior to forming the heat-dissipating adhesive layer, modifying the outer surface of the cigarette support portion.

8. The method of claim 6, wherein the heat-dissipating adhesive layer is formed by coating a heat-dissipating adhesive composition on the outer surface of the cigarette support portion by one method of spin coating, nozzle coating, spray coating, dip coating, and/or bar coating, and then drying.

9. The method of claim 6, wherein, in the bonding, the thermally pressing is carried out under a condition of 260-350° C.

10. The heater of claim 1, wherein the cigarette support portion has a cylindrical structure with a pointed end portion.

11. The heater of claim 10, wherein the heat-dissipating adhesive layer covers an entire surface of the cigarette support portion except for the pointed end portion.

12. The heater of claim 10, wherein the heat-dissipating adhesive layer covers an entire surface of the cigarette support portion.

* * * * *